(12) United States Patent
Yin

(10) Patent No.: US 7,744,005 B2
(45) Date of Patent: Jun. 29, 2010

(54) INDUCTION CARD WITH A PRINTED ANTENNA

(75) Inventor: Wen-Cheng Yin, Sinjhuang (TW)

(73) Assignee: Taiwan Name Plate Co., Ltd., Taipei (TW)

( * ) Notice: Subject to any disclaimer, the term of this patent is extended or adjusted under 35 U.S.C. 154(b) by 344 days.

(21) Appl. No.: 12/015,492

(22) Filed: Jan. 16, 2008

(65) Prior Publication Data

US 2009/0179817 A1 Jul. 16, 2009

(51) Int. Cl.
*G06K 19/06* (2006.01)
(52) U.S. Cl. .................. 235/492; 235/380; 343/866
(58) Field of Classification Search .................. 235/380, 235/436, 449, 487, 492; 343/866
See application file for complete search history.

(56) References Cited

U.S. PATENT DOCUMENTS

| 6,536,674 | B2 * | 3/2003 | Kayanakis et al. ........... 235/492 |
| 6,910,636 | B2 * | 6/2005 | Kim et al. .................... 235/492 |
| 7,278,586 | B2 * | 10/2007 | Takahashi et al. ........... 235/494 |
| 7,337,978 | B2 * | 3/2008 | Lee ............................. 235/492 |
| 7,597,266 | B2 * | 10/2009 | Benato ........................ 235/492 |
| 2005/0168339 | A1 * | 8/2005 | Arai et al. ................. 340/572.8 |
| 2006/0261171 | A1 * | 11/2006 | Buursma et al. ............ 235/487 |

* cited by examiner

*Primary Examiner*—Seung H Lee
(74) *Attorney, Agent, or Firm*—WPAT, P.C.

(57) ABSTRACT

An induction card with a printed antenna comprises: an upper cover film; an upper middle layer installed below the upper cover film; one or two surfaces of the upper middle layer being coated or printed with an upper patter layer; a pad thick layer installed below the upper middle layer; a hole being formed in the pad thick layer; an antenna coil layer installed below the pad thick layer; a printed antenna coil being formed on the antenna coil layer; a lower middle layer installed below the lower plastic layer; one or two surfaces of the lower middle layer being coated or printed with a lower patter layer; and a lower cover layer installed below the lower middle layer; the lower cover layer being installed with magnetic tape; and the lower cover layer is used as a protecting layer.

9 Claims, 4 Drawing Sheets

INDUCTION CARD WITH A PRINTED ANTENNA

FIELD OF THE INVENTION

The present invention relates to antennas, and particularly to an induction card with a printed antenna, wherein a chip is planed into a printed antenna coil having transmitting and receiving functions so that it can be used to an induction form terminal or a contact form IC card reader.

BACKGROUND OF THE INVENTION

Currently, in daily life, many different kinds of cards are used, such as debit cards, credit cards, telephone cards, traveling cards, etc. The cards can be classified as contact cards and non-contact cards. The contact cards use methods of magnetic induction, optic induction, IC detection, etc. in identification. The non-contact cards are layout with printed antenna coils in the inlay layers of the cards or have chips so that data can transmit wirelessly. To have wide applications, the non-contact card is planted with chip (or magnetic strip) with functions of contact cards and non-contact cards. Thereby the cards can be further used in various fields, such as school cards, door cards, credit cards, public traffic cards, etc. The antenna coil in the inlay layer will deeply affect whether the card can be functioned correctly. This kind of cards have widely used in many nations. In the manufacturing process of the antenna, etching or embedding enameled wires, etc. The etching induces the problem of environment protection. The embedding enameled wires will induce the problem of bad quality in the holing process.

SUMMARY OF THE INVENTION

Accordingly, the primary object of the present invention is to provide an induction card with a printed antenna, wherein a chip or a magnetic strip can be implanted into a printed antenna coil having transmitting and receiving functions so that it can be used to an induction form terminal or a contact form IC card reader. Moreover it can be used to a non-contact far field or near field induction. When the induction card contacts a card reader. The chip will determine whether the interface is a contact card reader or a non-contact card reader so as to communicate between the card and the reader.

Advantages of the present invention are that no etching or embedding process is used. The printing technology is used a kernel of the manufacturing process. The manufacturing time is shortened with a lower cost. Moreover the present invention provides multiple functions and is convenient in applications.

To achieve above objects, the present invention provides an induction card with a printed antenna, comprising: an upper cover film; an upper middle layer installed below the upper cover film; one or two surfaces of the upper middle layer being coated or printed with an upper patter layer; a pad thick layer installed below the upper middle layer; a hole being formed in the pad thick layer; an antenna coil layer installed below the pad thick layer; a printed antenna coil being formed on the antenna coil layer; a lower middle layer installed below the lower plastic layer; one or two surfaces of the lower middle layer being coated or printed with a lower patter layer; and a lower cover layer installed below the lower middle layer; the lower cover layer being installed with magnetic tape; and the lower cover layer is used as a protecting layer.

The induction card has a working frequency between 0~5.8 GHz; a resistance between 0.01~150Ω, an inductance between 0.01~10 μH, a capacitance between 0.01~10 pF, and a quality factor between 1~1000.

An upper plastic layer is installed between the upper middle layer and the pad thick layer for enhancing the strength of the signal. A lower plastic layer is installed between the antenna coil layer and the lower cover layer for enhancing the strength of the transmitting signals. The lower plastic layer may be neglected.

The various objects and advantages of the present invention will be more readily understood from the following detailed description when read in conjunction with the appended drawing.

DETAILED DESCRIPTION OF THE INVENTION

Figure 1:
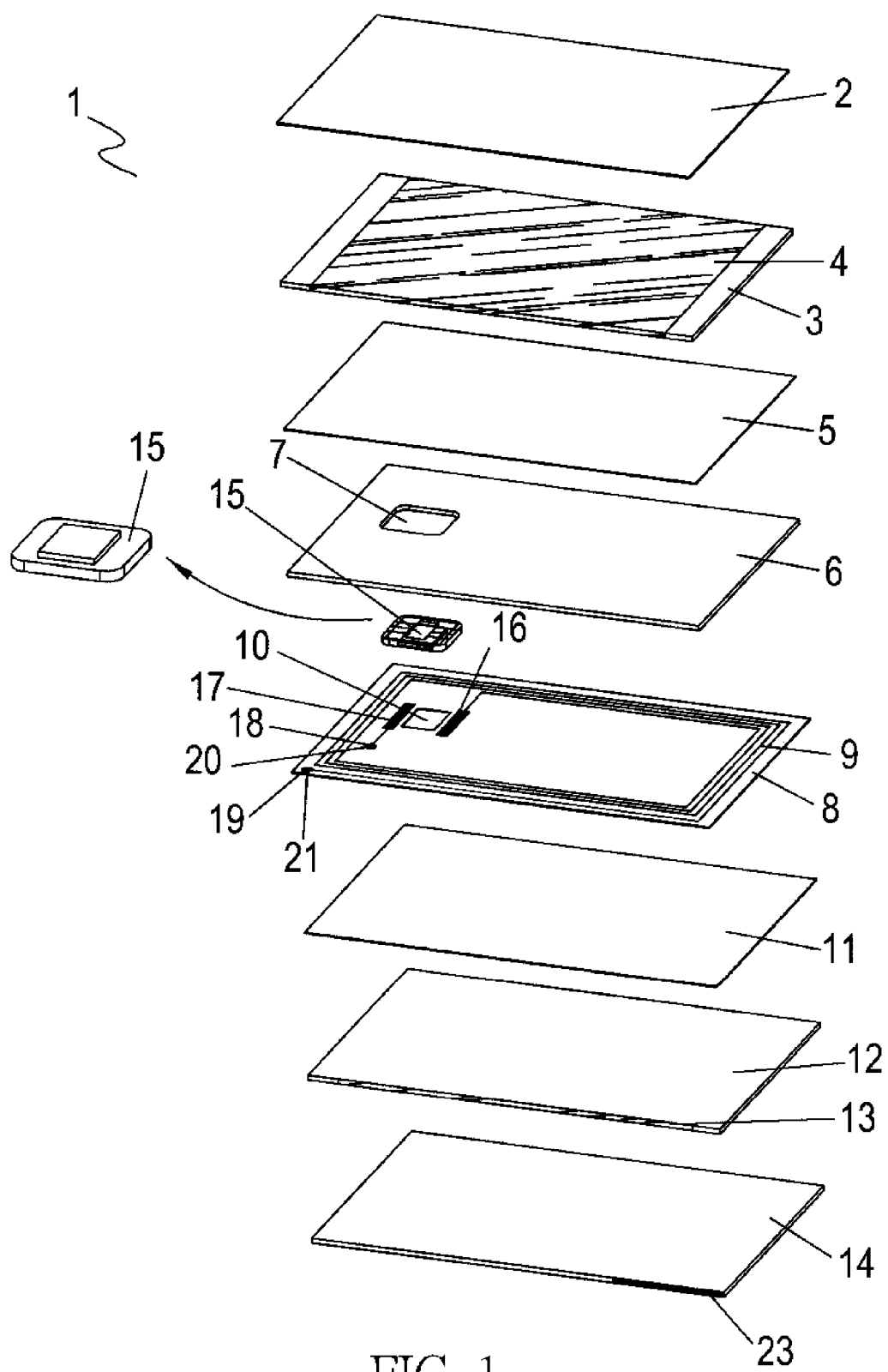
FIG. 1 is an exploded view of the induction card of the present invention.
Figure 2:
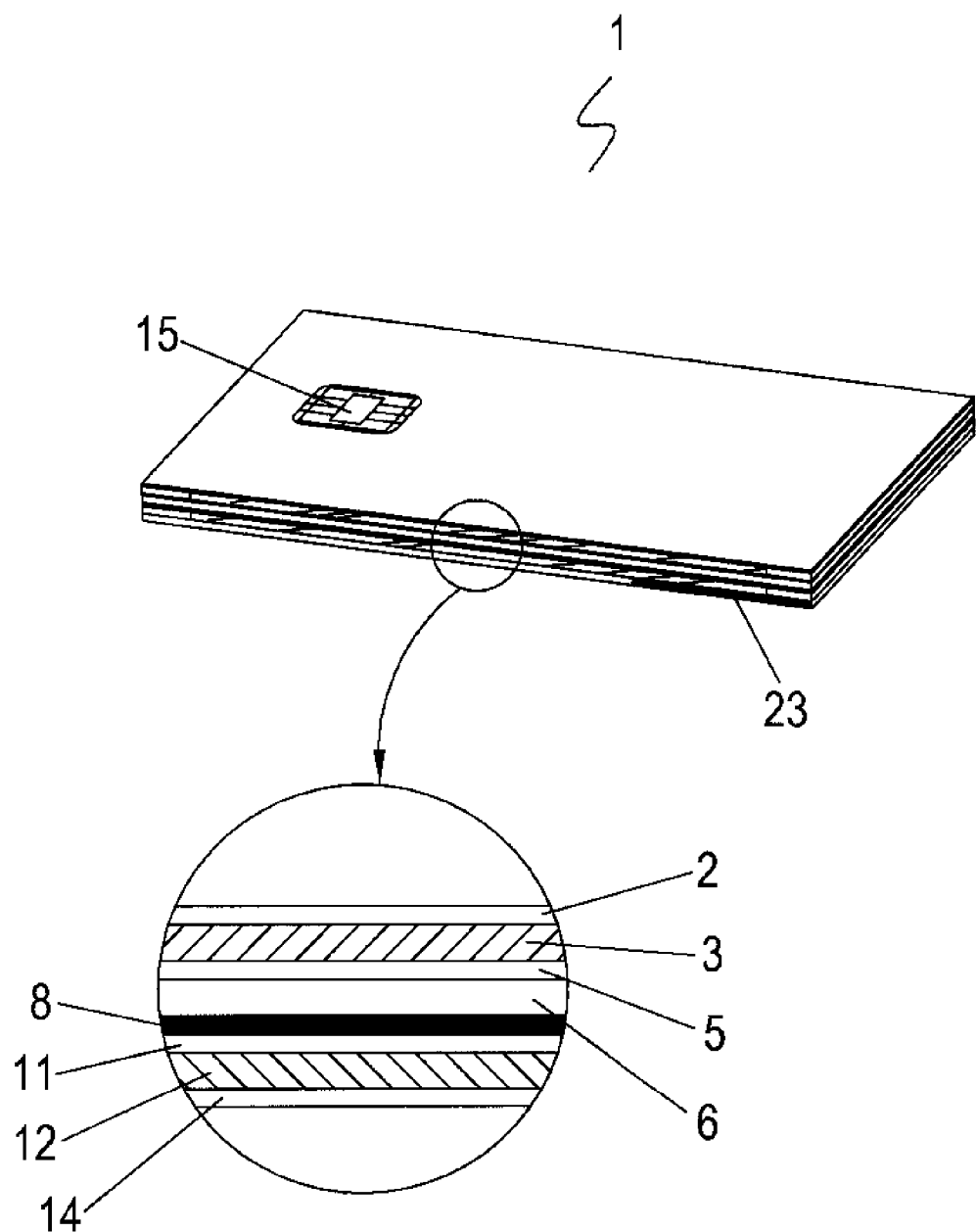
FIG. 2 is an assembled view of the induction card of the present invention.

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

An upper cover film 2 is included.

An upper middle layer 3 is installed below the upper cover film 2. One or two surfaces of the upper middle layer 3 are coated or printed with an upper patter layer 4.

An upper plastic layer 5 is installed below the upper middle layer 3 for enhancing the strength of the signal. In the present invention, the upper plastic layer 5 can be neglected.

A pad thick layer 6 is installed below the upper plastic layer 5. A hole 7 is formed in the pad thick layer 6. A position of the hole 7 is aligned to a chip 15. A depth of the hole 7 is corresponding to a height of the chip 15.

Figure 3:
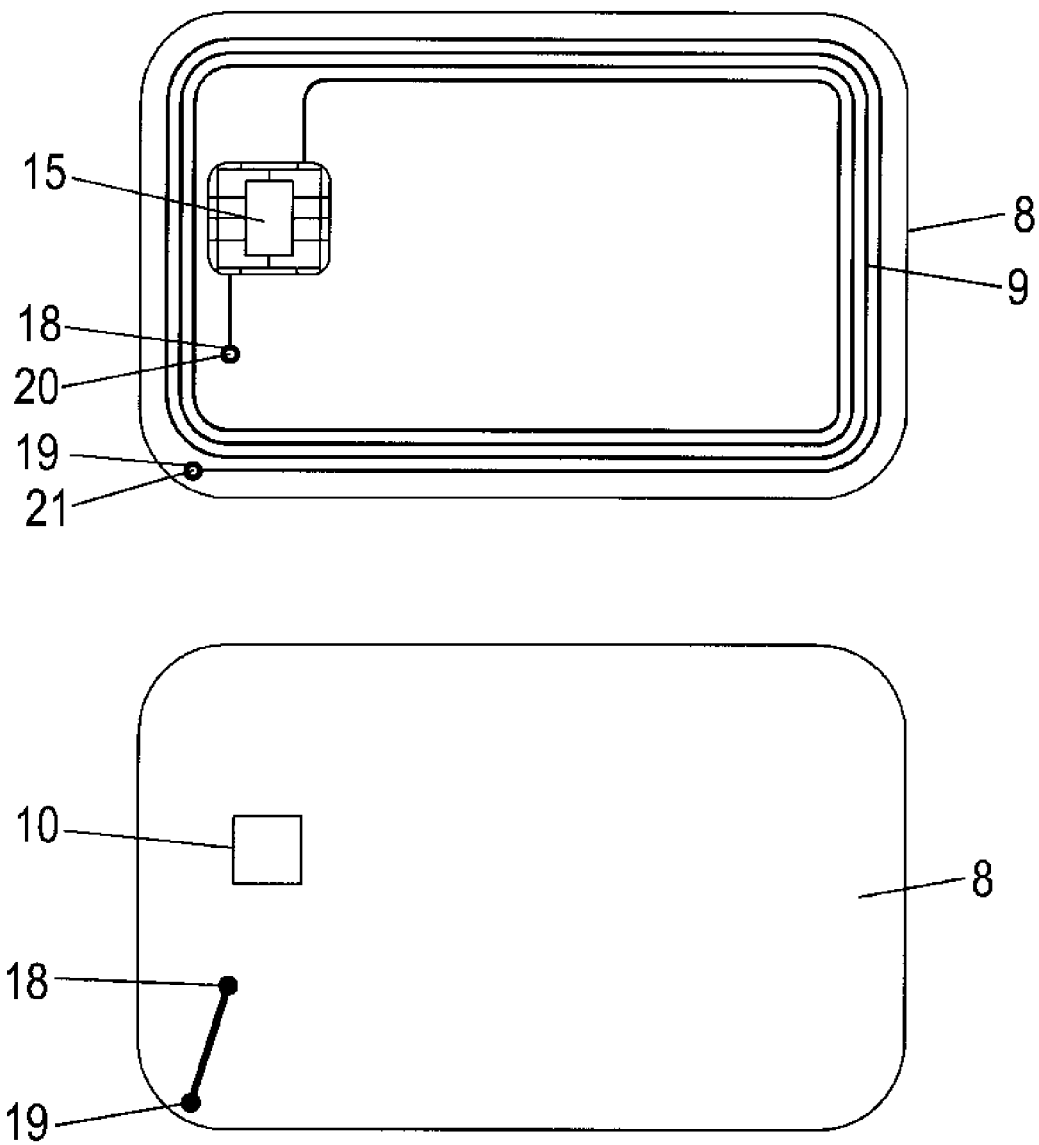
FIG. 3 shows the electric connection of the joints and the penetrating holes according to the present invention.
Figure 4:
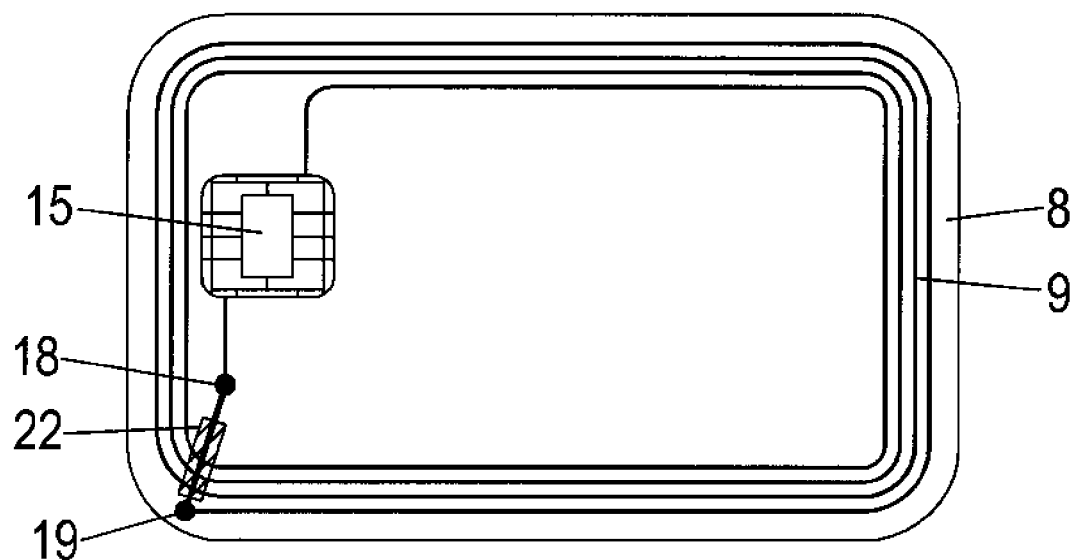
FIG. 4 shows that the joints are coated with insulating rubber layer according to the present invention.

An antenna coil layer 8 is installed below the pad thick layer 6. A printed antenna coil 9 is formed on the antenna coil layer 8. The printed antenna coil 9 has a plurality of concentric circles and is formed by printing. Each circle of the printed antenna coil 9 is spaced from another one so as to form as a receiving antenna. Two ends of the printed antenna coil 9 are formed as joints 16, 17 corresponding to the position of the chip. An opening 10 is installed between the joint 16 and joint 17. The chip 15 is placed upon the opening 10 and is electrically connected to the joints 16, 17. An internal joint 18 extends from the joint 17. The internal joint 18 is connected to an external joint 19 of the printed antenna coil 9 as a jump mechanism. The form for jumping includes the way by punching, or by using an insulating area. In punching, two penetrating holes 20, 21 are formed on the antenna coil layer 8. Referring to FIG. 3, conductive material is printed in the walls of the penetrating holes 20, 21 and an area at a back side of the antenna coil layer 8 and between the two penetrating holes 20, 21 so that the two penetrating holes 20, 21 are conductively connected. Thus it is formed with a function of an induction receiving coil so that the data in the chip 15 will be transmitted through the printed antenna coil 9. Thus the wireless transmission and receiving mechanism are achieved. Besides, for the jumping method, an insulting rubber layer 22 is installed between the internal joint 18 and the external joint 19 so as to partially cover the printed antenna coil 9. After the insulting treatment is performed (referring to FIG. 4), the conductive material is printed upon the insulting rubber layer 22 so that the internal joint 18 and the external joint 19 are conductive. Thus it is formed with a function of an induction receiving coil so that the data in the chip 15 will be transmitted through the printed antenna coil 9.

A lower plastic layer 11 is installed below the antenna coil layer 8 for enhancing the strength of the transmitting signals. The lower plastic layer 11 may be neglected.

A lower middle layer 12 is installed below the lower plastic layer 11. One or two surfaces of the lower middle layer 12 are coated or printed with a lower patter layer 13.

A lower cover layer 14 is installed below the lower middle layer 12. The lower cover layer 14 is installed with magnetic tape 23 (which may be neglected). The lower cover layer 14 is used as a protecting layer.

After assembly above mentioned layer, an induction card is formed, which has the following characteristics. The working frequency of the antenna is between 0~5.8 GHz. The antenna has a resistance between 0.01~150Ω, an inductance between 0.01~10 μH, a capacitance between 0.01~10 pF, and a quality factor between 1~1000. When the induction card 1 contacts a card reader. The chip 15 will determine whether the interface is a contact card reader or a non-contact card reader. When the induction card 1 moves near the card reader, a radio frequency identification (RFID) reader will provide a steady RF signal. When the induction card 1 enters into the working area of the antenna of the card reader so as to induce current, the chip 15 in the induction card 1 will be actuated so that the codes and other data itself will be transferred through an antenna to be received by the card reader. The reader decodes and demodulates the receiving signals. Then the signals are transferred to a rear end of the system for performing related processes. Thus, the system can determine whether the code is a permissible one so as to make corresponding process for different setting. Then instruction signals are transmitted for controlling other devices to make corresponding actions. Thus the induction card 1 of the present invention has the both functions of communication and operation. If a reading interface is a contact form card reader, the induction card 1 is packed with the chip 15 or magnetic tape 23 and external metal joints are provided so as to communicate with the card reader.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An induction card with a printed antenna, comprising:
   an upper cover film;
   an upper middle layer installed below the upper cover film; one or two surfaces of the upper middle layer being coated or printed with an upper patter layer;
   a pad thick layer installed below the upper middle layer; a hole being formed in the pad thick layer;
   an antenna coil layer installed below the pad thick layer; a printed antenna coil being formed on the antenna coil layer;
   a lower middle layer installed below the lower plastic layer; one or two surfaces of the lower middle layer being coated or printed with a lower patter layer; and
   a lower cover layer installed below the lower middle layer; the lower cover layer being installed with magnetic tape; and the lower cover layer is used as a protecting layer.

2. The induction card with a printed antenna as claimed in claim 1, wherein the induction card has a working frequency between 0~5.8 GHz; a resistance between 0.01~150Ω, an inductance between 0.01~10 μH, a capacitance between 0.01~10 pF, and a quality factor between 1~1000.

3. The induction card with a printed antenna as claimed in claim 1, wherein an upper plastic layer is installed between the upper middle layer and the pad thick layer for enhancing the strength of the signal.

4. The induction card with a printed antenna as claimed in claim 1, wherein a lower plastic layer is installed between the antenna coil layer and the lower cover layer for enhancing the strength of the transmitting signals.

5. The induction card with a printed antenna as claimed in claim 1, wherein the printed antenna coil having a plurality of concentric circles and being formed by printing; each circle of the printed antenna coil being spaced from another one so as to form as a receiving antenna.

6. The induction card with a printed antenna as claimed in claim 1, wherein two ends of the printed antenna coil are formed as joints corresponding to the position of the chip; an opening is installed between the joints; a chip is placed upon the opening and is electrically connected to the joints; an internal joint extends from one of the joints; the internal joint is connected to an external joint of the printed antenna coil as a jump mechanism.

7. The induction card with a printed antenna as claimed in claim 6, wherein one way of the jumping is performed by punching, that is, two penetrating holes are formed on the antenna coil layer; conductive material is printed in the walls of the penetrating holes and an area at a back side of the antenna coil layer and between the two penetrating holes so that the two penetrating holes are conductively connected; and thus it is formed with a function of an induction receiving coil so that the data in the chip will be transmitted through the printed antenna coil.

8. The induction card with a printed antenna as claimed in claim 6, wherein one way of the jumping is performed by installing an insulting rubber layer between the internal joint and the external joint so as to partially cover the printed antenna coil; after the insulting treatment is performed, the conductive material is printed upon the insulting rubber layer so that the internal joint and the external joint are conductive.

9. The induction card with a printed antenna as claimed in claim 1, wherein a bottom of the lower cover layer is adhered with a magnetic strip.

* * * * *